(12) United States Patent
Allwardt et al.

(10) Patent No.: US 9,460,566 B2
(45) Date of Patent: Oct. 4, 2016

(54) DATA RECORDER SYSTEM AND UNIT FOR A VEHICLE

(71) Applicant: Wabtec Holding Corp., Wilmerding, PA (US)

(72) Inventors: Theodore E. Allwardt, Frederick, MD (US); Khim Bittle, Myersville, MD (US); Brian Kurz, Frederick, MD (US); Carl L. Haas, Walkersville, MD (US)

(73) Assignee: Wabtec Holding Corp., Wilmerding, PA (US)

( * ) Notice: Subject to any disclaimer, the term of this patent is extended or adjusted under 35 U.S.C. 154(b) by 50 days.

(21) Appl. No.: 14/282,363

(22) Filed: May 20, 2014

(65) Prior Publication Data

US 2015/0339863 A1    Nov. 26, 2015

(51) Int. Cl.
*G06F 7/00* (2006.01)
*G07C 5/00* (2006.01)
*G07C 5/08* (2006.01)

(52) U.S. Cl.
CPC .............. *G07C 5/008* (2013.01); *G07C 5/00* (2013.01); *G07C 5/08* (2013.01); *G07C 5/085* (2013.01); *G07C 5/0866* (2013.01)

(58) Field of Classification Search
CPC ..... G07C 5/008; G07C 5/085; G07C 5/0866
See application file for complete search history.

(56) References Cited

U.S. PATENT DOCUMENTS

| | | | |
|---|---|---|---|
| 5,185,700 A | 2/1993 | Bezos et al. | |
| 6,795,759 B2 | 9/2004 | Doyle | |
| 6,831,680 B1 * | 12/2004 | Kumler | B64D 45/0015 348/148 |
| 7,593,963 B2 | 9/2009 | Ballesty et al. | |
| 7,703,291 B2 | 4/2010 | Bushnik et al. | |
| 7,769,509 B2 | 8/2010 | Gaughan et al. | |
| 7,965,312 B2 | 6/2011 | Chung et al. | |
| 8,420,930 B2 | 4/2013 | Martin et al. | |
| 2002/0107619 A1 * | 8/2002 | Klausner | G07C 5/085 701/32.2 |
| 2003/0048202 A1 * | 3/2003 | Francois | G08B 13/1965 340/945 |
| 2003/0081121 A1 | 5/2003 | Kirmuss | |
| 2003/0081127 A1 | 5/2003 | Kirmuss | |
| 2003/0152145 A1 * | 8/2003 | Kawakita | H04N 5/77 375/240.12 |
| 2003/0222981 A1 | 12/2003 | Kisak et al. | |
| 2005/0086274 A1 * | 4/2005 | Mori | G11B 20/10 708/200 |
| 2006/0244830 A1 | 11/2006 | Davenport et al. | |
| 2010/0014842 A1 * | 1/2010 | Eder | B60R 1/00 386/200 |
| 2011/0216200 A1 | 9/2011 | Chung et al. | |
| 2014/0267724 A1 * | 9/2014 | Goergen | H04N 5/23245 348/148 |
| 2015/0021444 A1 * | 1/2015 | Goergen | G06F 3/0604 246/122 R |

FOREIGN PATENT DOCUMENTS

| | | |
|---|---|---|
| WO | 2007064671 A1 | 6/2007 |
| WO | 2008005620 A2 | 1/2008 |
| WO | 2008144163 A1 | 11/2008 |

\* cited by examiner

*Primary Examiner* — Mary Cheung

(74) *Attorney, Agent, or Firm* — The Webb Law Firm

(57) ABSTRACT

Disclosed is a data recording unit and data recording system for use in connection with a vehicle, such as a train, a locomotive of a train, a railcar of a train, and the like.

30 Claims, 2 Drawing Sheets

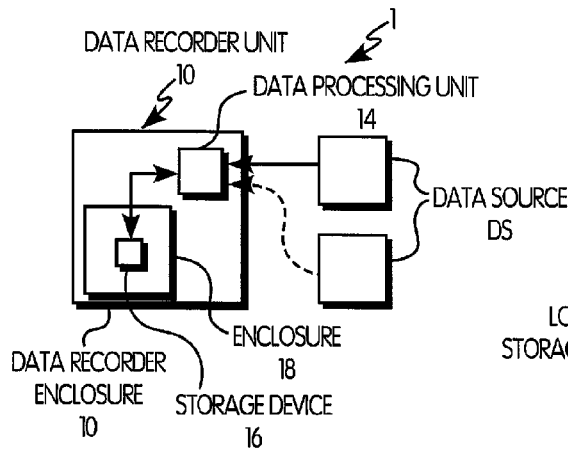
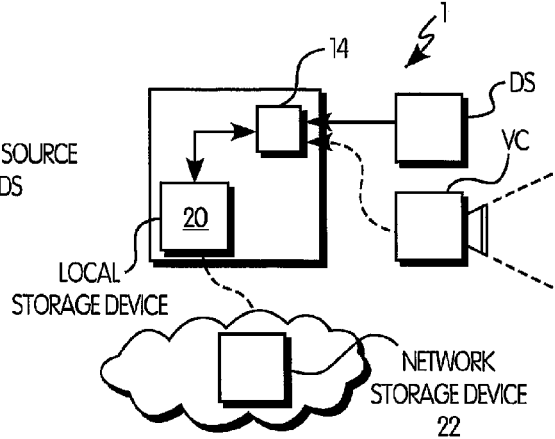
FIG. 1
FIG. 2
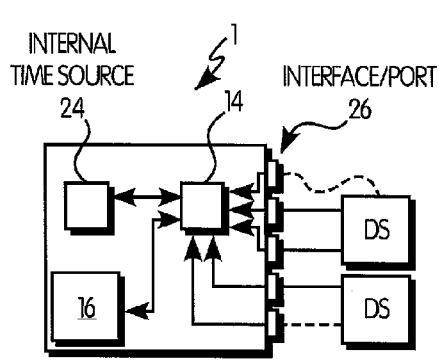
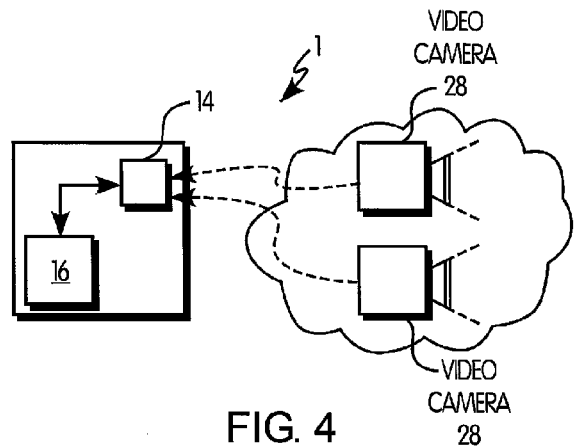
FIG. 3
FIG. 4
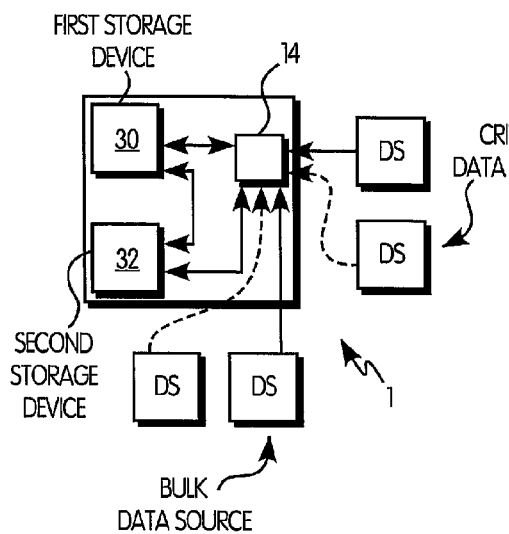
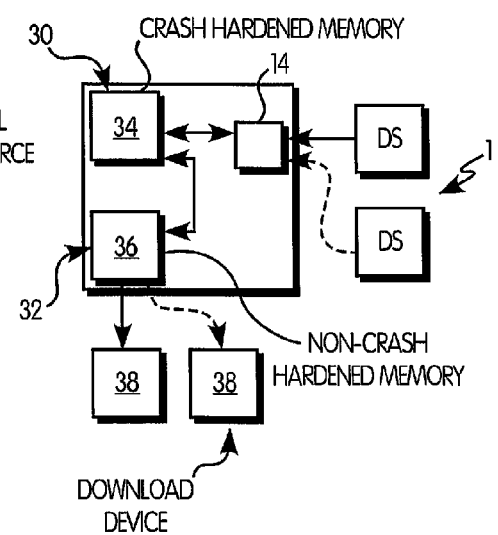
FIG. 5
FIG. 6

TEMPERATURE
SENSOR
40

ENERGY STORAGE
DEVICE
42

DATA RECORDER SYSTEM AND UNIT FOR A VEHICLE

BACKGROUND OF THE INVENTION

1. Field of the Invention

This invention relates generally to vehicle systems and networks, such as railway systems including trains travelling in a track or rail network, and in particular to data storage and management systems and methods for use in connection with one or more data sources or inputs, such as event recording systems and associated devices, used on or in connection with one or more locomotives or railcars of a train.

2. Description of Related Art

Vehicle systems and networks exist throughout the world, and, at any point in time, a multitude of vehicles, such as cars, trucks, buses, trains, and the like, are travelling throughout the system and network. Many of these vehicles are equipped with various target devices that measure, determine, and/or track certain conditions, parameters, operational states, physical data or information, and the like. For example, a train may include an event recorder and/or other components or devices that measure, determine, and/or track certain conditions or states of the equipment of the train, such as pressure, temperature, speed, operational states, and the like, and/or conditions or states of the areas or environment in or around the train. These devices are normally attached to or associated with one or more of the locomotives of a train. Further, in another example, such event recorders and/or other components or devices are attached to or associated with a truck, a bus, or other vehicle where the conditions and states of certain pieces of equipment are or should be tracked.

With respect to railway systems, and as is known, train event recorders and recording systems receive and store train event data from a train management system and/or other components and systems of a locomotive, railcar, track network, wayside equipment, end-of-train unit, head-of-train device unit, and the like, where this information and data relate to the operating conditions or states of the train, of the area in the train, of the area or environment around the train, and the like. Train event recording systems are designed to be crash-worthy and include crash-resistant housings to preserve the recorded train event data in the event of a crash, derailment, or other type of accident.

Train event recorders and recording systems may provide download or transfer options to facilitate the transfer of train event data to one or more external storage devices. In addition, the Federal Railroad Administration (FRA), such as at 49 C.F.R. §229, requires train event recording systems to comply with basic specifications, such as the crashworthiness of the memory, although the capabilities of these systems can be enhanced beyond these requirements. To be in compliance, all leading locomotives of trains in the United States that travel faster than 30 miles per hour on a United States rail network must have crash-worthy event recording systems that record certain safety-critical events needed for investigating an accident.

Train event recording systems may monitor a variety of analog and digital outputs from the train management computer, directly from certain target devices that output data and information, and/or from other equipment and sources. Various existing train event recording systems and train management systems are shown and described in U.S. Pat. Nos. 7,965,312; 7,593,963; 8,420,930; 5,185,700; 7,703,291; and 6,795,759; U.S. Publication Nos.: 2003/0222981; 2011/0216200; 2006/0244830; 2003/0081121; and 2003/0081127; and Publication Nos.: WO 2007064671; WO 2008144163; and WO 2008005620.

SUMMARY OF THE INVENTION

Generally, provided are data recorder systems and units for a vehicle that overcome some or all of the drawbacks and deficiencies associated with known data recorder systems and units. Preferably, provided are data recorder systems and units for a vehicle that are useful in connection with railway system and the trains travelling therein. Preferably, provided are data recorder systems and units for a vehicle that comply with the requirements of the Federal Railroad Administration. Preferably, provided are data recorder systems and units for a vehicle that provide storage solutions and arrangements that adequately store and protect the desired data, especially in the event of an accident. Preferably, provided are data recorder systems and units for a vehicle that provide data transfer, synchronization, and storage methods that facilitate appropriate storage, retrieval, and usage of data stored therein.

According to one preferred and non-limiting embodiment, provided is a data recorder unit for a vehicle, including: at least one data recorder enclosure configured to house at least one internal component; at least one data processing unit located in the enclosure and configured to directly or indirectly receive data input from at least one data source associated with the vehicle; and at least one storage device in direct or indirect communication with the at least one data processing unit and configured to store data received from the at least one data processing unit; wherein the at least one storage device is at least one local storage device located within a crash- and/or fire-proof enclosure, which is positioned within the data recorder enclosure. Further, the at least one local storage device is in the form of a network-attached storage device.

In another preferred and non-limiting embodiment, provided is a data recorder unit for a vehicle, including: at least one data recorder enclosure configured to house at least one internal component; at least one data storage device comprising crash-hardened memory, the at least one data storage device located in the enclosure; and at least one data processing unit located in the enclosure and configured to directly or indirectly receive data from a plurality of data inputs and synchronize data from the plurality of data inputs based at least partially on at least one of the following: time data from at least one internal time source, time data from at least one data input of the plurality of data inputs, or any combination thereof.

In a further preferred and non-limiting embodiment, provided is a data recorder unit for a vehicle, including: at least one video camera device configured to: generate video data associated with the vehicle and/or its surroundings; and wirelessly transmit at least a portion of the video data; and a data recorder unit, comprising: (a) at least one data recorder enclosure configured to house at least one internal component; (b) at least one data processing unit located in the enclosure and configured to: (i) receive at least a portion of the video data from the at least one video camera device; (ii) process at least a portion of the video data; and (iii) generate processed video data based at least partially on the video data; and (c) at least one storage device comprising crash-hardened memory in direct or indirect communication with the at least one data processing unit and configured to store at least a portion of at least one of the video data and the processed video data.

In a still further preferred and non-limiting embodiment, provided is a data recorder system for a vehicle, including: at least one data recorder enclosure configured to house at least one internal component; at least one data processing unit located in the enclosure and configured to directly or indirectly receive data input from at least one data source associated with the vehicle; and at least one storage device in direct or indirect communication with the at least one data processing unit and configured to store data received from the at least one data processing unit; wherein the at least one storage device comprises at least one first storage device comprising at least one non-crash-hardened memory and at least one second storage device comprising at least one crash-hardened memory.

In another preferred and non-limiting embodiment, provided is a data recorder unit for a vehicle, including: at least one data recorder enclosure configured to house at least one internal component; at least one data processing unit located in the enclosure and configured to directly or indirectly receive data input from at least one data source associated with the vehicle; and at least one storage device in direct or indirect communication with the at least one data processing unit and configured to store data received from the at least one data processing unit; wherein the at least one storage device comprises at least one crash-hardened memory and/or at least one fire-resistant memory, wherein the power dissipation of the at least one storage device is throttled based at least partially upon a sensed temperature.

In a further preferred and non-limiting embodiment, provided is a data recorder unit for a vehicle, including: at least one data recorder enclosure configured to house at least one internal component; at least one data processing unit located in the enclosure and configured to directly or indirectly receive data input from at least one data source associated with the vehicle; at least one storage device in direct or indirect communication with the at least one data processing unit and configured to store data received from the at least one data processing unit; and at least one energy storage device configured to store electrical energy and provide the stored electrical energy to at least one component of the data recorder unit when a main power supply to the at least one storage device is lost, removed, or unavailable. Further, the at least one energy storage device is in electrical communication with the at least one data processing unit, and the at least one data processing unit is configured to store, on the at least one storage device and using the stored electrical energy, data input from the at least one data source after the main power supply is lost, removed, or unavailable.

In another preferred and non-limiting embodiment, provided is a data recorder unit for a vehicle, including: at least one data recorder enclosure configured to house at least one internal component; at least one data processing unit located in the enclosure and configured to directly or indirectly receive data input from at least one data source associated with the vehicle; at least one storage device in direct or indirect communication with the at least one data processing unit and configured to store data received from the at least one data processing unit; and at least one energy storage device configured to store electrical energy and provide the stored electrical energy to at least one component of the data recorder unit when a main power supply to the at least one storage device is lost, removed, or unavailable. Further, the at least one data source comprises at least one video camera in electrical communication with at least one second energy storage device, and the at least one video camera is configured to transmit video data to the data recorder unit when a power supply to the at least one video camera is lost or removed using stored energy from the at least one second energy storage device.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is a schematic view of one embodiment of a data recorder unit and system according to the principles of the present invention;

FIG. 2 is a schematic view of another embodiment of a data recorder unit and system according to the principles of the present invention;

FIG. 3 is a schematic view of a further embodiment of a data recorder unit and system according to the principles of the present invention;

FIG. 4 is a schematic view of a still further embodiment of a data recorder unit and system according to the principles of the present invention;

FIG. 5 is a schematic view of another embodiment of a data recorder unit and system according to the principles of the present invention;

FIG. 6 is a schematic view of another embodiment of a data recorder unit and system according to the principles of the present invention;

DETAILED DESCRIPTION OF THE PREFERRED EMBODIMENTS

Figure 7:
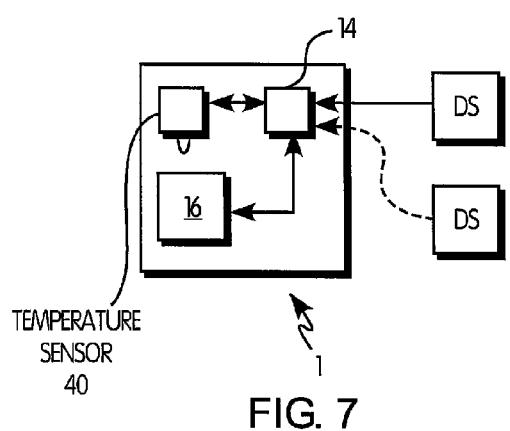
FIG. 7 is a schematic view of a further embodiment of a data recorder unit and system according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, e.g., electrical signals, electricity, current, energy, and the like, messages, commands, and/or type of signal or data. For one unit or device to be in communication with another unit or device means that the one unit or device is able to receive signals or data from and/or transmit signals or data to the other unit or device. A communication may use a direct or indirect connection, and may be wired and/or wireless in nature. Additionally, two units or devices may be in communication with each other even though the signals or data transmitted may be modified, processed, routed, etc., between the first and second unit or device. For example, a first unit may be in communication with a second unit even though the first unit passively receives signals or data, and does not actively transmit signals or data to the second unit. As another example, a first unit may be in communication with a second unit if an intermediary unit processes signals or data from one unit and transmits processed signals or data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. Further, and as used hereinafter, the term "electrical communication" specifically refers to the transmission of electrical signals (e.g., electricity, current, energy, and the like) between two or more units or devices.

The terms "data recorder unit" and "data recorder system", as used interchangeably herein, may refer to any data recording unit for a vehicle, and in one preferred and non-limiting embodiment, refer to a train event recorder and/or train event recording system, which may refer to any event recording device or system used on a locomotive, railcar, or train that records train event data. The data recorder unit and data recorder system may include one or more hardware and/or software components in communication with one or more components and/or systems, i.e., data sources, of a vehicle, including a train or railway, such as, but not limited to, a train management computer, a head-of-train unit, an end-of-train unit, wayside equipment, operator interfaces and/or other like systems and components. In this context, the data recorder unit and/or data recorder system according to the present invention can be used to receive, process, record and/or store data representing information about locomotives, railcars, wayside equipment, track signals, and/or train operators including, but not limited to, velocity, brake pressure, error signals, system states, prompts and user inputs, mandatory directives, movement authority signals, warnings and enforcement information, direction of travel, distance traveled, throttle position, brake operation, headlight status, horn operation, cab signals, audio data, video data, and/or the like, as well as data and information directed to the internal and/or external surroundings or environment in or around the train, the railcars, the locomotive, and the like. In addition to train event recorders installed in a locomotive and in communication with a train management computer, event recorders may also include railcar event recorders such as that described by U.S. Pat. No. 7,769,509 to Gaughan et al., the entirety of which is incorporated by reference herein.

The present invention is directed to a data recorder system 1 and data recorder unit 10 that are useful in connection with data recording systems for vehicles. As discussed above, and in one preferred and non-limiting embodiment, the data recorder system 1 and data recorder unit 10 according to the present invention are used on or in connection with a locomotive and/or train. As such, the data recorder system 1 and data recorder unit 10 may be integrated with or used in connection with new or existing train event recorders and train event recording systems. Various preferred and non-limiting embodiments of the data recorder system 1 and data recorder unit 10 according to the present invention are illustrated in schematic form in FIGS. 1-8.

With specific reference to FIG. 1, and in one preferred and non-limiting embodiment, provided is a data recorder unit 10 for a vehicle (now shown), such as a locomotive or train. The data recorder unit 10 includes at least one data recorder enclosure 12 that is configured to house certain internal components, as discussed hereinafter. This data recorder enclosure 12 is sized, shaped, or configured to be attached to and/or integrated with various portions of the vehicle, such as in the locomotive of a train. Typically, the data recorder unit 10 is attached to or integrated with the locomotive in such a way that it would survive any accident or incident involving the train, and recovered at the scene in order to extract the data and gain a better understanding of the conditions or states of the train, its various components, and/or the vehicle internal or external surroundings or environment.

At least one data processing unit 14 is located in the recorder enclosure 12 and programmed or configured to directly or indirectly receive data input from at least one, and typically multiple, data sources DS, which are associated with the vehicle or its surroundings. In addition, at least one storage device 16 is in direct or indirect communication with the data processing unit 14 and configured to store data received from the data processing unit 14. In this preferred and non-limiting embodiment, the storage device 16 is in the form of a crash-hardened solid-state storage device that is located within a crash- and/or fire-proof enclosure 18. It will be appreciated that the solid-state storage device may also be non-crash-hardened. In particular, this crash- and/or fire-proof enclosure 18 is positioned within the data recorder enclosure 12. In this manner, the storage device 16 is further protected, i.e., beyond the protection from the data recorder enclosure 12, in the event of a crash, fire, accident, or other incident involving the vehicle. This provides a further level of protection to the data that is received by the data processing unit 14 and stored on the storage device 16; again, for use in data analysis before, during, or after the event. For example, data extraction from the storage device 16 may occur at any time, but typically occurs either on a periodic basis or after some incident has occurred.

In another preferred and non-limiting embodiment, and as illustrated in FIG. 2, the data recorder unit 10 includes a local storage device 20, which is in direct or indirect communication with at least one network storage device 22. In operation, some or all of the data input that is provided by the data processing unit 14 to the local storage device 20 is wirelessly transferred to the network storage device 22 on a dynamic basis, periodic basis, pre-determined basis, substantially continual basis, or any combination thereof. In this manner, if there is a catastrophic vehicle incident, where the data recorder unit 10 is unrecoverable or completely destroyed, the data is still available through the network storage device 22. In another preferred and non-limiting embodiment, the network storage device 22 is a remote storage device, and may also be in the form of a virtual memory of or storage device accessible through wireless or network communication.

In another preferred and non-limiting embodiment, the local storage device 20 includes or is in the form of a network-attached storage device. In this example, the local storage device 20 may have a logical partition dedicated and/or configured to act as local storage, and a logical partition dedicated and/or configured to act as network storage. The network storage partition may be made available to other devices in communication with a network. In this embodiment, it is envisioned that only specific data inputs and/or outputs could be saved to or used by the logical partition dedicated and/or configured as network-attached storage.

In a preferred and non-limiting embodiment, the local storage device 20 is in the form of a crash-hardened memory, which complies with specified FRA rules and regulations. However, it will be appreciated that non-crash-hardened memory may also be used and that, in some non-limiting embodiments, both crash-hardened and non-crash-hardened memory may be used. Similarly, and in a further preferred and non-limiting embodiment, the local storage device 20 is located within a crash- and/or fire-proof enclosure 18, which is positioned within the data recorder enclosure 12. In another preferred and non-limiting embodiment, the data source DS is in the form of a video camera VC or similar visual capture device, and the data processing unit 14 is configured or programmed to transmit or cause a transmission of video data to the network storage device 22.

With reference to FIG. 3, and in another preferred and non-limiting embodiment, the data recorder unit 10 includes at least one internal time source 24. In this embodiment, the data processing unit 14 is programmed or configured to synchronize data from the variety of data inputs based at least partially on this internal time source 24. Using the internal time source 24 to synchronize data across some or all of the data streams provides accurate playback and analysis of the incoming data. These data inputs may be in the form of a variety of interfaces or ports 26. For example, as illustrated in FIG. 3, these data inputs may include an Ethernet input, a serial input, a parallel input, a wireless interface, an Ethernet interface, a serial interface, a parallel interface, an Ethernet port, a serial port, and/or a parallel port. In addition, it should be noted that these data inputs (as well as the data sources DS discussed above) may provide data to the data processing unit 14 in a hardwired or wireless and/or direct or indirect form. Accordingly, the data processing unit 14 includes the necessary programs (and the data recorder unit 10 includes the necessary internal components) to receive hardwired and/or wireless data input. In another preferred and non-limiting embodiment, the internal time source 24 will be in the form of a separate time reference that may be synchronized to some external locomotive or vehicle source.

In another preferred and non-limiting embodiment, the data is synchronized across multiple data inputs using at least a portion of the time data (e.g., a timestamp or other time-informative data) from at least one data input or data sources DS. For example, the time data from one specified data input may be used in synchronizing data from another data input (or multiple other data inputs) to ensure complete and accurate synchronization across multiple data inputs. Further, the time data from any of the data inputs or data sources DS, and/or the above-discussed internal time source 24, may be stored or recorded at or on the data recorder unit 12. The use of the time data to synchronize across multiple data inputs or data sources DS facilitates the ability to specify how data is retrieved, synchronized, or otherwise used.

In a preferred and non-limiting embodiment, and with continued reference to FIG. 3, the independent time source 24 may be used to synchronize data received that has independent, external time data. For example, a data source may provide video data that is associated with time data from an independent time source (e.g., a time source internal to a video camera or other device). To synchronize all or a portion of the data received by the data recorder unit 10, the data processing unit 14 is programmed or configured to compare time data associated with one or more data sources to determine if the various times are synchronized. For example, the data processing unit 14 may determine that clocks or other time sources of one or more data sources are not in synchronization with each other or with the internal time source 24 of the data recorder unit 10. In a further non-limiting embodiment, two or more data sources may be recorded to separate partitions of the storage device 16. In this example, the recorded data in the separate partitions may be synchronized by using the internal time source 24. Further, this synchronization information and data may be transmitted or distributed to other control systems or data repositories, such as an on-board computer of a train, a back office server of a railroad, or some other remote system.

In a further preferred and non-limiting embodiment, and as illustrated in FIG. 4, the data recorder system 1 includes one or more video camera devices 28 (i.e., a video or visual data capture device), which are configured to generate video data associated with the vehicle and/or its internal or external surroundings or environment, and transmit at least a portion of this video data wirelessly and/or through hard-wired connections. This video data may include raw data, formatted data, pre-processed data, and the like. In this embodiment, the data processing unit 14 is programmed or configured to receive at least a portion of the video data from the video camera device 28, process at least a portion of this raw video data, and generate processed video data based at least partially on the video data. Further, at least a portion of this video data and/or processed video data is stored on the storage device 16. In another preferred and non-limiting embodiment, the storage device 16 is in the form of a solid-state storage device, which is located within a crash- and/or fire-proof enclosure 18, which is, in turn, positioned within the data recorder enclosure 12. In one preferred and non-limiting embodiment, the data processing unit 14 will include or be based upon a Linux recording application for a standard network camera.

In a preferred and non-limiting embodiment, and with continued reference to FIG. 4, at least one video camera 28 may be an Internet protocol (IP) camera, and the video data captured by the video camera 28 may be transmitted to the data recorder unit 10 wirelessly over a network connection. The video camera 28 and/or the data recorder unit 10 may include a wireless interface to transmit and/or receive data wirelessly. For example, a wireless Ethernet interface on the data recorder unit 10 may receive video data from the video camera 28 over a network. Further, the data recorder unit 10 may include an Ethernet interface with which the video camera 28 (or other data source DS) is in wired communication. In some non-limiting embodiments, this video data may be saved to a partition of the storage device 16 configured as network-attached storage. However, it will be appreciated that the connection may also be hardwired. In non-limiting embodiments, the network connection is both wired and wireless. In such embodiments, the hardwired connection may be used to transmit video data in the event that a network connection is lost, removed, or unavailable. For example, a power outage may affect network devices such as routers and/or switches and a hardwired connection may allow for continued transmission of video data despite such outages.

In a further preferred and non-limiting embodiment, and with reference to FIG. 5, the storage device 16 includes at least one first storage device 30 in the form of at least one solid-state storage device, and at least one second storage device 32 that is in the form of at least one crash-hardened memory. In a further preferred and non-limiting embodiment, the solid-state storage device is a removable solid-state storage device, and the data processing unit 14 is configured to store all or a portion of a specified data set or certain information on this removable solid-state storage device, such as from a "bulk data" data source DS. Further, in this embodiment, the second storage device 32 is configured to store all or a portion of specified critical data or information from a critical data source DS that is in communication with the data processing unit 14.

As illustrated in FIG. 6, and in another preferred and non-limiting embodiment, the storage device 16 includes the first storage device 30 and the second storage device 32. However, in this embodiment, the first storage device 30 is in the form of at least one crash-hardened memory 34, and the second storage device 32 is in the form of at least one non-crash-hardened memory 36. In this embodiment, the data processing unit 14 is configured to initially transfer or store data on the first storage device 30, and at least a portion of this data is then cached on the second storage device 32. This cached data may represent authenticated data, encrypted data, verified data, digitally-signed data, specified data, critical data, and/or dynamic data. In addition, in this embodiment, the second storage device 32 is configured for wired or wireless transmission of at least a portion of this cached data to at least one download device 38. Further, in this embodiment, the first storage device 30 and/or the second storage device 32 may be in the form of at least one solid-state storage device. By using this caching storage methodology, the cached data is more readily accessible and more easily (and quickly) downloadable to the download device 38.

Moreover, according to another non-limiting embodiment, an arrangement using both crash-hardened memory 34 and non-crash-hardened memory 36 allows for inexpensive non-crash-hardened memory 36 to be used for recording non-critical data. Additionally, and as explained above, the use of separate data storage devices 30, 32 may allow for the most recent data to be cached on the crash-hardened memory 34 while non-recent data is stored and continuously over-written on the non-crash-hardened memory 36. In such embodiments, in the event of an accident, the most recently recorded video data pertaining to the accident will be preserved on the crash-hardened storage device 32. The most current and/or recent video data may be determined by a storage capacity of the second storage device 32 and/or a predetermined or specified duration of time (e.g., minutes and/or seconds of video data). The existing data on the crash-hardened memory 36 may be overwritten in the order in which it was recorded in a first in, first out manner, using the crash-hardened memory 36 as a data stack or data buffer.

In a further preferred and non-limiting embodiment, the data recorder unit 10 or another device in communication with the data recorder unit 10 is programmed or configured to detect an event. Such an event may include, for example, an emergency brake application, an indication or signal from a Positive Train Control (PTC) system, a rapid deceleration, and/or a detection of an impact or derailment based on accelerometer, gyroscope, and/or impact sensor data. In response to detecting an event, or receiving a signal or other indication that an event has occurred, the data processing unit 14 may continue caching data received and prevent at least a portion of the data stored on the storage device 16 from being overwritten. For example, and with reference to FIG. 6, in response to the occurrence of an event, the data recorder unit 10 may prevent some or all of the data cached on a crash-hardened storage device 32 from being overwritten by newly-received data, and may continue caching the newly-received data until a maximum capacity of the crash-hardened storage device 32 has been reached or until a specified time.

With reference to FIG. 7, and in another preferred and non-limiting embodiment, the data recorder unit 10 includes a storage device 16 that may be crash-hardened memory 34 and/or fire-resistant memory. In this embodiment, the power dissipation of the storage device 16 can be adjusted or throttled based at least partially upon a sensed temperature of the storage device 16 and/or data recorder unit 10. In particular, this sensed temperature may be generated by or derived from at least one temperature sensor 40 located on or within (or adjacent to) the data recorder unit 10. In particular, and in one preferred and non-limiting embodiment, the power dissipation is throttled as temperature increases. In addition, in this embodiment, the storage device 16 may be in the form of at least one solid-state storage device.

With continued reference to FIG. 7, the power dissipation of the storage device 16 may be throttled in numerous ways to maintain or adjust the temperature below a specified or predetermined threshold. For example, the power may be dissipated by discarding non-critical data, temporarily buffering data without recording it to the storage device 16, storing non-critical data on at least one other storage device, and/or adjusting a flow of data to reduce the amount of non-critical data recorded on the storage device 16. Data that is temporarily buffered rather than recorded to the storage device 16 for which the power dissipation is being throttled or adjusted may be recorded to the storage device 16 at a later time when the temperature is lowered or otherwise reaches an acceptable level. It will be appreciated by those skilled in the art that the power dissipation of the storage device 16 may be throttled in various other ways in response to the detection of a temperature that equals or exceeds a specified or predetermined threshold or maximum temperature.

Figure 8:
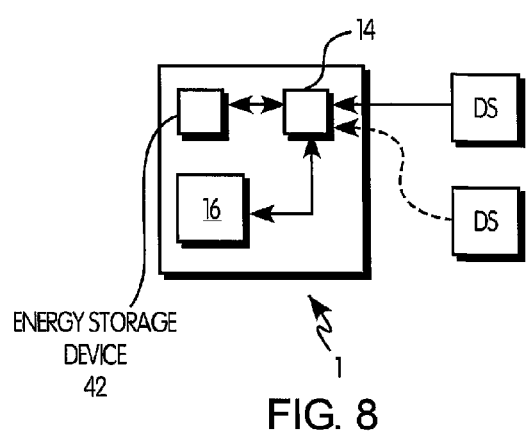
FIG. 8 is a schematic view of a still further embodiment of a data recorder unit and system according to the principles of the present invention.

A still further preferred and non-limiting embodiment is illustrated in FIG. 8. In this embodiment, the data recorder unit 10 includes at least one energy storage device 42. The energy storage device 42 may include, for example, one or more super capacitors, one or more batteries, or any other like device that can store energy. The energy storage device 42 may allow for the data recorder unit 10 to continue operation after a main power supply has been lost, removed, or otherwise made unavailable. For example, in the event of an accident that damages or affects a main power supply, the various components of the data recorder unit 10 may operate using power from the energy storage device 42 to continue recording data. This back-up power supply may prevent data corruption by allowing a recordation process to complete. The data processing unit 14 may be programmed or configured to facilitate a graceful shutdown of the data recorder unit 10 using energy stored on the energy storage device 42. In a further non-limiting embodiment, the data processing unit 14 may be programmed or configured to detect a loss of power from a main power supply and, in response to detecting the loss of power, initiate a reduced power mode in which only critical data is stored on the storage device 16. In this way, the energy stored on the energy storage device 42 can be conserved to allow for continued operation of the data recorder unit 10.

With continued reference to FIG. 8, and in a further preferred and non-limiting embodiment, the data processing unit 14 is programmed or configured to determine, generate, derive, or cause to be stored on the storage device 16 the date and/or the time based on a date and/or time retained on volatile memory. The date and/or time may therefore be preserved if a main power supply is lost, removed, or becomes otherwise unavailable by using the energy storage device 42. The energy storage device 42 may also help preserve the date and/or time between power cycles. The energy storage device 42 may be positioned within the data recorder unit 10 as shown in FIG. 8 or, in other non-limiting embodiments, may be positioned elsewhere and in electrical communication with any of the components, e.g., the data processing device 14, the storage device 16, etc., of the data recorder unit 10.

In a further preferred and non-limiting embodiment, and with reference to FIG. 4, one or more video cameras 28 may also include or be in electrical communication with an energy storage device, such as but not limited to a super capacitor or battery. The energy storage device associated with the video camera 28 may be internal or external to the video camera 28 and may store an amount of energy sufficient to continue powering the video camera 28 in the event that a main power supply is lost, removed, or otherwise becomes unavailable. In this way, the data recorder unit 10 may continue receiving and storing video data from the video camera 28 even after an accident has occurred and a main power supply is unavailable. As explained above, the video camera 28 may also transmit the video data over a hardwired connection in response to a loss of power or a loss of a wireless network connection that may result from an accident.

In another preferred and non-limiting embodiment, the data recorder unit 10 is mechanically compatible with a five MCU LSI rack mount, and powered by standard 74 VDC locomotive power, but also configured to accept nominal voltages of 32 VDC and 110 VDC. In this embodiment, the data recorder unit 10 includes military-style, high-reliability connectors and M12 Industrial Ethernet connectors. Various indicators are provided on the data recorder unit 10 to indicate power, self-diagnostics, recording, and/or link status. In this embodiment, the data recorder unit 10 includes a certified DOT Crashworthy memory, and is operable or configurable through a browser-based configuration and download program, which may be a local program on the data processing unit 14, or a remote program on some other computer or device. In this embodiment, the data recorder unit 10 includes a serial port for Legacy Link connection to existing data recorder units for retrofit applications.

In another preferred and non-limiting embodiment, the crash-worthy memory module of the data recorder unit 10 is capable of storing at least 96 GB of data and video, and includes a video data partition and an FRA/PTC data partition. The video data partition is used for receiving data from two video cameras VC at 450 KB/s each for 24 hours, which would normally utilize approximately 78 GB of storage. The FRA/PTC data partition allows for the storage of 48 hours of information, i.e., specified data and information.

In another preferred and non-limiting embodiment, a three-memory storage device 16 is used and includes a crash-hardened memory 34 for all of the FRA/PTC data elements. In addition, a crash-hardened memory 34 is used to store video data prior to an incident, and an 8 GB video partition will provide complete protection of about 2.5 hours of the most recent video data. In addition, an industrial-rated memory of about 96 GB is used to store extended video data in a solid-state memory that has enhanced temperature and vibration robustness for reliable long-term recording in an industrial environment. In particular, in this embodiment, the crash-hardened memory 34 would utilize a 16 GB memory module with the appropriate partitions for data storage.

In another preferred and non-limiting embodiment, the data processing unit 14 uses the Intel Atom processor board running at 1.3 GHz with 1 GB of SDRAM. This data processing unit 14 exhibits the appropriate processing power to handle streaming video, and the processor support, in this embodiment, is based on PCI-e expansion buses, which are used to provide the Ethernet and memory port peripherals. A Linux operating system can be used to permit utilization of industry standard and known network software components. In this embodiment, three Ethernet ports are provided as support to on-board networks, as per S-9101B, and provide a third port for streaming video.

In a still further and non-limiting embodiment, and with reference to FIG. 2, the local storage device 20 and/or network storage device 22 is in the form of a network-attached storage device that uses the Network File System (NFS) protocol. The video application, whether on the video camera VC or the data processing unit 14 will store or cause to be stored data in its own format, as needed. The transport layer (Transmission Control Protocol (TCP)) can be used for ensuring delivery, delivery sequence, and that the data has not been modified during transmission. The video application, again whether on a video camera VC or on the data processing unit 14, stores files to the mapped drive of the network-attached storage device.

In another preferred and non-limiting embodiment, time synchronization for the data, such as the video data, will be implemented using the Precision Time Protocol (PTP). The data processing unit 14 may act as the master device or control, and the video application on the video camera VC will act as the slave device or control. In this embodiment, a time reference, e.g., such as through the use of an internal time source 24, will be provided to the video camera VC to allow for synchronization of data between the video camera VC (or video application) and other data applications, and in order to allow synchronization during playback.

In this manner, provided is a data recorder system 1 and data recorder unit 10 that provide improved storage and synchronization methods and arrangements for event recording devices. The data recorder system 1 and data recorder unit 10 of the present invention are useful in connection with railway systems and the trains traveling therein, and preferably comply with the requirements of the Federal Railroad Administration. In addition, the data recorder system 1 and data recorder unit 10 provide storage solutions and arrangements that adequately store and protect the desired data, especially in the event of an accident. In addition, the data recorder system 1 and data recorder unit 10 provide for data transfer, synchronization, and storage methods that facilitate appropriate retrieval and usage of data stored therein.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A data recorder unit for a vehicle, comprising:
at least one data recorder enclosure configured to house at least one internal component;
at least one data processing unit located in the enclosure and configured to directly or indirectly receive data input from at least one data source associated with the vehicle; and
at least one storage device in direct or indirect communication with the at least one data processing unit and configured to store data received from the at least one data processing unit;
wherein the at least one storage device comprises at least one first storage device comprising at least one non-crash-hardened memory and at least one second storage device comprising at least one crash-hardened memory, and
wherein the at least one data processing unit is configured to store at least a portion of the data on the at least one non-crash-hardened memory and the at least one crash-hardened memory substantially in parallel.

2. The data recorder unit of claim 1, wherein the at least one first storage device comprises a solid-state storage device.

3. The data recorder unit of claim 1, wherein the at least one data processing unit is configured to record over existing recorded data on the at least one crash-hardened memory when at least one of the following occurs: the at least one crash-hardened memory has reached capacity, a predetermined amount of data has been recorded, a predetermined duration of video data has been recorded, or any combination thereof, wherein the existing data on the at least one crash-hardened memory is recorded over in an order in which it was recorded.

4. The data recorder unit of claim 3, wherein the at least one data processing unit is configured to detect an accident and, in response to detecting the accident, stop recording over existing recorded data on the at least one crash-hardened memory.

5. The data recorder unit of claim 4, wherein the at least one data processing unit is configured to detect the accident based at least partially on at least one of the following: emergency brake application, rapid deceleration, accelerometer data, impact sensor data, an indication from a positive train control (PTC) system, or any combination thereof.

6. The data recorder unit of claim 1, wherein the at least one data source associated with the vehicle comprises at least one video camera, and wherein the at least one video camera comprises at least one of the following: a wired video camera, a wireless Internet protocol (IP) video camera, a wireless interface, or any combination thereof.

7. The data recorder unit of claim 1, wherein a capacity of the at least one first storage device is greater than a capacity of the at least one second storage device, and wherein the at least one data processing unit is configured to store data on the at least one first storage device and the at least one second storage device substantially in parallel, such that data stored on the at least one first storage device is inclusive of data stored on the at least one second storage device.

8. The data recorder unit of claim 1, wherein the at least one data processing unit is configured to initially store data on the at least one first storage device, and wherein at least a portion of the data is cached on the at least one second storage device.

9. The data recorder unit of claim 8, wherein at least a portion of the cached data is at least one of the following: authenticated, encrypted, verified, digitally-signed, specified data, critical data, dynamic data, or any combination thereof.

10. The data recorder unit of claim 8, wherein the at least one data processing unit is configured to cache a specified amount of current data, and overwrite existing non-current data.

11. The data recorder unit of claim 1, wherein the at least one second storage device is configured for wired or wireless transmission of at least a portion of the cached data to at least one download device.

12. The data recorder unit of claim 1, wherein the at least one non-crash-hardened memory is removable.

13. A data recorder unit for a vehicle, comprising:
at least one data recorder enclosure configured to house at least one internal component;
at least one data processing unit located in the enclosure and configured to directly or indirectly receive data input from at least one data source associated with the vehicle; and
at least one storage device in direct or indirect communication with the at least one data processing unit and configured to store data received from the at least one data processing unit;
wherein the at least one storage device comprises at least one first storage device comprising at least one non-crash-hardened memory and at least one second storage device comprising at least one crash-hardened memory, and
wherein the at least one non-crash-hardened memory is removable,
wherein the at least one data processing unit is configured to store at least a portion of the data on the at least one non-crash-hardened memory and the at least one crash-hardened memory substantially in parallel.

14. The data recorder unit of claim 13, wherein the at least one first storage device comprises a solid-state storage device.

15. The data recorder unit of claim 13, wherein the at least one data processing unit is configured to store non-critical data in the at least one non-crash-hardened memory, and specified critical data in the at least one crash-hardened memory.

16. The data recorder unit of claim 13, wherein the at least one data processing unit is configured to record over existing recorded data on the at least one crash-hardened memory when at least one of the following occurs: the at least one crash-hardened memory has reached capacity, a predetermined amount of data has been recorded, a predetermined duration of video data has been recorded, or any combination thereof, wherein the existing data on the at least one crash-hardened memory is recorded over in an order in which it was recorded.

17. The data recorder unit of claim 16, wherein the at least one data processing unit is configured to detect an accident and, in response to detecting the accident, stop recording over existing recorded data on the at least one crash-hardened memory.

18. The data recorder unit of claim 17, wherein the at least one data processing unit is configured to detect the accident based at least partially on at least one of the following: emergency brake application, rapid deceleration, accelerometer data, impact sensor data, an indication from a positive train control (PTC) system, or any combination thereof.

19. The data recorder unit of claim 13, wherein the at least one data source associated with the vehicle comprises at least one video camera, and wherein the at least one video camera comprises at least one of the following: a wired video camera, a wireless Internet protocol (IP) video camera, a wireless interface, or any combination thereof.

20. The data recorder unit of claim 13, wherein a capacity of the at least one first storage device is greater than a capacity of the at least one second storage device, and wherein the at least one data processing unit is configured to store data on the at least one first storage device and the at least one second storage device substantially in parallel, such that data stored on the at least one first storage device is inclusive of data stored on the at least one second storage device.

21. The data recorder unit of claim 13, wherein the at least one data processing unit is configured to initially store data on the at least one first storage device, and wherein at least a portion of the data is cached on the at least one second storage device.

22. The data recorder unit of claim 21, wherein at least a portion of the cached data is at least one of the following: authenticated, encrypted, verified, digitally-signed, specified data, critical data, dynamic data, or any combination thereof.

23. The data recorder unit of claim 21, wherein the at least one data processing unit is configured to cache a specified amount of current data, and overwrite existing non-current data.

24. The data recorder unit of claim 13, wherein the at least one second storage device is configured for wired or wireless transmission of at least a portion of the cached data to at least one download device.

25. A data recorder unit for a vehicle, comprising:
at least one data recorder enclosure configured to house at least one internal component;
at least one data processing unit located in the enclosure and configured to directly or indirectly receive data input from at least one data source associated with the vehicle; and
at least one storage device in direct or indirect communication with the at least one data processing unit and configured to store data received from the at least one data processing unit;
wherein the at least one storage device comprises at least one first storage device comprising at least one non-crash-hardened memory and at least one second storage device comprising at least one crash-hardened memory, and
wherein the at least one data processing unit is configured to store non-critical data in the at least one non-crash-hardened memory, and specified critical data in the at least one crash-hardened memory,
wherein the at least one data processing unit is configured to store at least a portion of the data on the at least one non-crash-hardened memory and the at least one crash-hardened memory substantially in parallel.

26. A data recorder unit for a vehicle comprising:
at least one first storage device comprising at least one non-crash-hardened memory;
at least one second storage device comprising at least one crash-hardened memory; and
at least one non-transitory computer-readable medium comprising program instructions that, when executed by at least one processor, cause the at least one processor to:
(a) directly or indirectly receive data input from at least one data source associated with the vehicle; and
(b) store at least a portion of the data on the at least one non-crash-hardened memory and the at least one crash-hardened memory substantially in parallel.

27. The data recorder unit of claim 26, wherein the at least one non-crash-hardened memory is removable.

28. A data recorder unit for a vehicle comprising:
at least one data processing unit configured to directly or indirectly receive data input from at least one data source associated with the vehicle;
at least one first storage device in communication with the at least one data processing unit, the at least one first storage device comprising at least one non-crash-hardened memory; and
at least one second storage device in communication with at least one data processing unit, the at least one second storage device comprising at least one crash-hardened memory,
wherein the at least one data processing unit is configured to store at least a portion of the data on the at least one non-crash-hardened memory and the at least one crash-hardened memory substantially in parallel.

29. The data recorder unit of claim 28, wherein the at least one non-crash-hardened memory is removable.

30. A method of storing data on a data recorder unit for a vehicle, the data recorder unit comprising at least one data processing unit, a first storage device, and a second storage device, comprising:
receiving, with the at least one data processing unit, data from at least one data source associated with a vehicle;
storing, with the at least one data processing unit, at least a portion of the data received from the at least one data source on the first storage device, the first storage device comprising a non-crash-hardened memory; and
storing, with the at least one data processing unit and substantially in parallel with storing the at least a portion of the data on the first storage device, at least a portion of the data received from the at least one data source on the second storage device, the second storage device comprising at least one crash-hardened memory.

* * * * *